Feb. 17, 1959 D. P. DONCASTER 2,873,978

PHONOGRAPH TONE ARM

Filed June 22, 1954 2 Sheets-Sheet 1

INVENTOR
DANIEL P. DONCASTER
BY
Campbell, Brumbaugh, Free & Graves
HIS ATTORNEYS Feb. 17, 1959 D. P. DONCASTER 2,873,978

PHONOGRAPH TONE ARM

Filed June 22, 1954 2 Sheets-Sheet 2

INVENTOR
DANIEL P. DONCASTER
BY Campbell, Brumbaugh, Free & Graves
HIS ATTORNEYS 2,873,978
Patented Feb. 17, 1959

2,873,978

PHONOGRAPH TONE ARM

Daniel P. Doncaster, Long Island City, N. Y., assignor to Columbia Broadcasting System, Inc., New York, N. Y., a corporation of New York Application June 22, 1954, Serial No. 438,518

4 Claims. (Cl. 274—23)

The present invention relates to electric phonographs and more particularly to new and improved portable electric phonograph apparatus that is small in size and light in weight yet is capable of high quality performance.

While completely self-contained portable electric phonographs capable of rendering performance of good quality have been devised, they have generally been restricted in use to locations where power from electric mains is available. In recent years, however, a demand has arisen for means capable of providing music and the like at places such as the beach, for example, where electric power from mains is not readily available. In an effort to meet this demand, small light-weight battery operated receivers have been devised that are capable of satisfactory reception. However, up to the present there has been no small light-weight electric phonograph capable of good quality reproduction under these conditions.

It is an object of the invention, accordingly to provide new and improved portable electric phonograph apparatus that is small and light in weight yet capable of high quality performance in any location, regardless of the unavailability of power from electric mains.

Another object of the invention is to provide new and improved portable electric phonograph apparatus of the above character that is capable of playing selectively records designed for different speeds of rotation.

These and other objects of the invention are attained by providing in a portable case of small size a low power record drive mechanism, a light-weight pickup and tone arm, a loudspeaker, electric amplifier means and miniature batteries for supplying electric power to the several components. The record drive mechanism is designed for minimum power requirements and to this end it comprises a three point record support formed by a pair of idler rollers and driven roller means angularly spaced apart about a spindle adapted to accommodate the usual record center hole. The driven roller means comprises a pair of driven rollers mounted different distances from the spindle on a shaft driven by an electric motor powered by the battery supply.

The driven rollers are of different sizes such that when say a seven inch record is placed with its center hole over the spindle it rests on the two idler rollers and only one of the driven rollers which drives it at a speed of 45 R. P. M., for example. On the other hand, when a ten or twelve inch record is placed with its center hole over the spindle, it rests on the two idler rollers and only the second of the driven rollers which drives it at, say 33⅓ R. P. M. The invention also contemplates the provision of means for maintaining the record speed correct over the useful life of the batteries.

The invention may be better understood from the following detailed description of a preferred embodiment taken in conjunction with the accompanying drawings in which.

Figure 2:
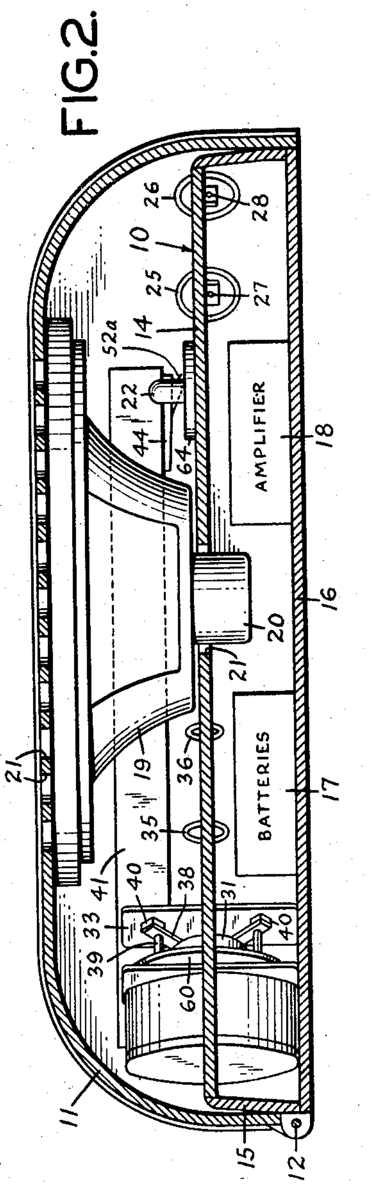
Fig. 2 is a view in section taken along the line 2—2 of Fig. 1, looking in the direction of the arrows.
Figure 1:
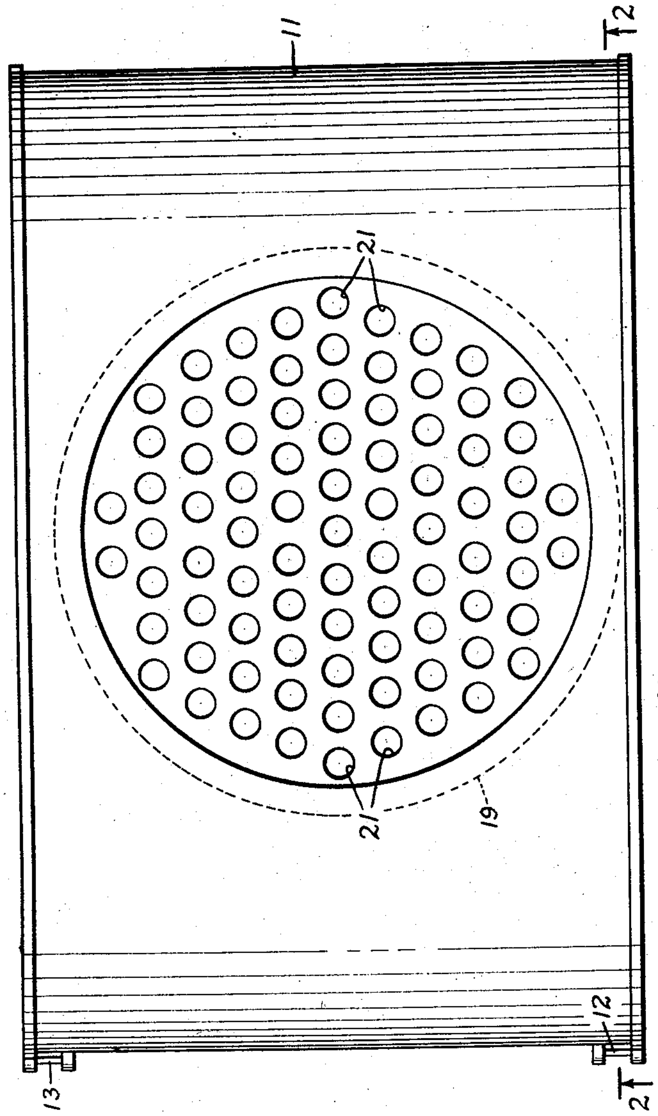
Fig. 1 is a plan view of the outside case of a portable electric phonograph constructed according to the invention.

Referring to Figs. 1 and 2, a portable electric phonograph is shown which comprises a shallow base 10 nested in a cover 11 of generally inverted bathtub shape which is secured to the base 10 by hinges 12 and 13. The base 10 includes a mounting board or plate 14 supported on a skirt portion 15 having a bottom closure member 16 defining a space within which miniature batteries 17 and a conventional audio amplifier 18 may be disposed.

Secured inside the cover 11 is a conventional permanent magnet loudspeaker 19, the rear portion 20 of which is adapted to be received within an opening 21 formed in the mounting board 14 so as to enable the depth of the phonograph to be reduced to a minimum. The cover 11 may be provided with a plurality of perforations 21 in the vicinity of the speaker 19 so as to afford free passage for the sound generated by the latter.

Figures 3, 4, 4A:
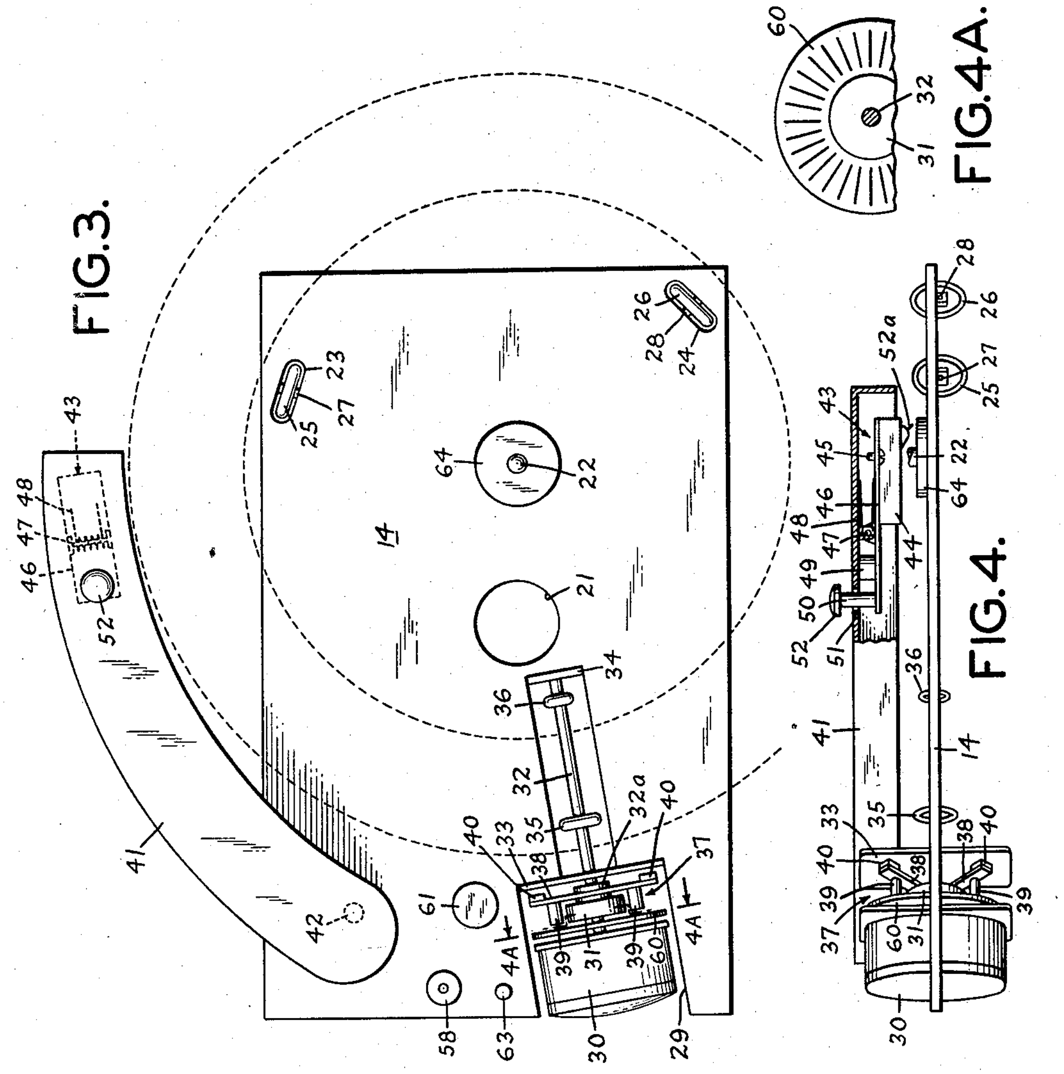
Fig. 3 is a plan view of the mounting board for the record drive mechanism and other components of the phonograph shown in Figs. 1 and 2.
Fig. 4 is a view in elevation of the mounting board shown in Fig. 3.
Fig. 4A is a view in section taken along the line 4A—4A of Fig. 4 showing a stroboscope disc useful in adjusting the record speed.

As shown in Figs. 3 and 4, the mounting board 14 carries a center pin 22 which may be stationary or rotatable but which is not driven as in the conventional type of phonograph. Formed in the mounting board 14 at positions angularly spaced apart with respect to the center pin 22 are a pair of slots 23 and 24 through which project a pair of idler rollers 25 and 26, respectively, mounted on shafts 27 and 28, respectively, journalled in suitable bearings supported by the mounting board 14. Preferably, the shafts 27 and 28 lie on radial lines passing through the center pin 22.

In the end of the mounting board 14 opposite the idler rollers 23 and 24 is formed a cut-out 29 in which is mounted a small D. C. electric motor 30 of relatively low electric power requirements. The motor 30 is coupled by a coupling member 31 to a shaft 32 journalled in bearings 33 and 34. Mounted on the shaft 32 for rotation therewith are a pair of spaced apart driving rollers 35 and 36, as shown.

The driving roller 36 is positioned relatively close to the center pin 22 and it is of such diameter that when a conventional 7 inch diameter record is being played, it will rest on the rollers 25, 26 and 36 and will be driven by the roller 36 at a speed of say 45 R. P. M.

The driving roller 35 is mounted on the drive shaft 32 a greater distance from the center pin 22 than the driving roller 36, and its diameter is such that when a 10 or 12 inch record is positioned with its center hole over the center pin 22 it rests on the rollers 25, 26 and 35 and is driven by the latter at a speed of say 33⅓ R. P. M.

The motor 30 is adapted to drive the shaft 32 at substantially constant speed but, as stated, the diameters of the driving rollers 35 and 36 are appropriately selected so that 7 inch records, for example, will be driven at 45 R. P. M., whereas 10 or 12 inch records will be driven at 33⅓ R. P. M.

In order to assist in maintaining the speed of the shaft 32 substantially constant, a speed governor 37 (Figs. 3 and 4) is mounted thereon. The governor 37 may comprise, for example, a plurality of laterally extending spring arms 38 carried by a hub 32a on the shaft 32, each of which carries on one side a weight 39 and on the other side a friction member such as a felt pad 40, for example. The pads 40 are adapted to cooperate with the plate 33 which serves as one bearing for the shaft 32 to brake the latter as required to slow it down in the event that the speed becomes too high.

Initially, the governor 37 is adjusted so that when the shaft 32 is running at the correct speed, the pads 40 are just out of engagement with the plate 33. If any increase in speed occurs, the weights 39 will be displaced outwardly by centrifugal force, causing the pads 40 to come into engagement with the plate 33. The friction generated by the pads 40 rubbing against the plates 33 tends to slow down the shaft 32 until the correct speed is attained.

The mounting board 14 also carries a conventional tone arm 41 which is pivoted at 42 and which carries at its forward end a pickup 43. As best shown in Fig. 4, the pickup 43 comprises the usual cartridge 44 which may be a piezo electric device, for example, secured by a screw 45 or other suitable means to a plate 46 pivoted intermediate its ends on a shaft 47. Normally, the cartridge 44 is urged towards the record by a light compression spring 48 which may be wound around the shaft 47, as shown in Figs. 3 and 4. A stop 49 may be provided to limit downward movement of the cartridge 44 under the influence of the spring 48. In order to facilitate lifting the cartridge 44 away from the record, the plate 46 is provided with an actuator member 50 which extends through an opening 51 in the tone arm 41 and has a button 52 formed at the upper end thereof.

The pickup 43 is properly balanced and designed so that it will exert a very low needle pressure on the record, thus minimizing the load imposed on the driving motor 30. The continuous light pressure exerted by the spring 48 on the cartridge 44, however, insures that the needle 52a will track properly on the record. It will be apparent that by depressing the knob 52, the cartridge 44 can be readily lifted from the record when desired without damaging the latter, a feature of considerable importance where microgroove records are being played.

Figure 5:
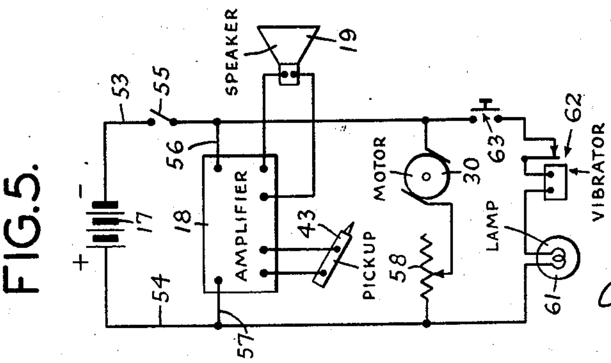
Fig. 5 is a schematic diagram of a typical electrical circuit for the portable electric phonograph of the invention.

In the typical circuit shown in Fig. 5, the output of the supply battery 17 is made available through the conductors 53 and 54, a conventional on-off switch 55 being provided in series with the conductor 53. Connected to the conductors 53 and 54 are conductors 56 and 57, respectively, which supply power for proper operation of the audio amplifier 18. As shown in the figure, the amplifier 18 receives a signal input from the pickup 43 and provides an output to the loudspeaker 19. The conductors 53 and 54 also supply power to the motor 30 through an adjustable resistance 58, by means of which the speed may be adjusted, as required, to maintain substantially constant record speed over the useful life of the battery 17.

In order to facilitate adjustment of the speed of the motor 30, it is desirable to provide means for verifying the fact that the motor shaft 32 in Fig. 3 is running at the correct speed. Suitable means may comprise a stroboscope disc 60 (Figs. 3 and 4A) on the shaft 32 which is adapted to be illuminated periodically by a lamp 61 energized by the battery 17 through the conductors 53 and 54 and a conventional vibrator 62 (Fig. 5). The interruption rate of the vibrator 62 should be properly related to the pattern on the stroboscopic disc 60 to insure that a stationary pattern will be produced when the shaft 32 (Fig. 3) is rotating at the correct speed. In order to minimize the drain on the battery 17, the lamp 61 and vibrator 62 are normally disconnected therefrom and a conventional push button switch 63 is provided which may be actuated when it is desired to adjust the speed of the shaft 33.

In operation, the cover is raised to a position at right angles to the base 10 and the on-off switch 55 (Fig.5) is turned on. The variable resistance 58 is then adjusted, if necessary, with the push button switch 63 closed until a stationary pattern is obtained on the stroboscope disc 60 (Fig. 4A). The shaft 32 will then be running at the correct speed for proper operation. When a conventional 45 R. P. M. record is to be played, a disc 64 of plastic or other suitable material may be mounted on the center pin 22 (Fig. 3) so as to adapt the latter for the enlarged center hole in records of this type. The record is then placed with its center hole over the disc 64 so that it rests on the idler rollers 23 and 24 and on the driving roller 36. Under these conditions, the record will rotate correctly at 45 R. P. M. and it may be played in the usual manner by placing the pickup 43 at the start position thereon.

When a conventional 33⅓ R. P. M. record of 10 or 12 inches diameter is to be played, it is placed with its center hole over the center pin 22 (Fig. 3) (the plastic disc 64 being first removed) so that it rests on the idler rollers 23 and 24 and on the driving roller 35. Under these conditions, the record will rotate at the correct speed of 33⅓ R. P. M. Since the driving roller 36 is smaller in diameter than the roller 35, it will be understood that the former will not interfere with the record that is being played.

The invention thus provides a novel and highly effective portable electric phonograph which is small in size and light in weight yet is capable of high quality operation in locations where electric power from mains is not available. By virtue of the low power record drive mechanism and light weight pickup employed, the drain on the battery supply is very low so that the apparatus is capable of effective operation for a considerable number of hours.

It will be understood that the illustrative embodiment described herein may be modified in form and detail within the scope of the invention as defined in the following claims.

I claim:

1. In a phonograph pickup device, the combination of an arm mounted for pivoting movement at one end thereof and having a housing portion adjacent the other end thereof, a support member pivotally mounted on a fixed axis in said housing portion intermediate its ends and carrying at a position on one side of the pivotal mounting thereof record groove responsive electroacoustic transducer means, means biasing said support member to urge said transducer means normally away from said arm, and actuator means coupled to said support member at a position on the other side of the pivotal mounting therefor and having a manually depressable portion extending upwardly through an opening in said housing whereby said transducer means may be moved towards said arm to facilitate removing said transducer means from the surface of a record.

2. In a phonograph pickup device, the combination of an arm mounted at one end thereof for pivoting movement about a vertical axis, record groove responsive electroacoustic transducer means mounted at the other end of said arm for pivoting movement about a fixed axis normal to said arm and parallel to the path of movement thereof, means biasing said transducer means to urge a portion thereof away from said arm, and manually depressable actuator means coupled to said transducer means for exerting on the latter a force counter to said biasing means to urge said transducer means portion towards said arm.

3. In a phonograph pickup device, the combination of an arm mounted at one end thereof for pivoting movement about a vertical axis only, record groove responsive electroacoustic transducer means mounted at the other end of said arm for pivoting movement about a fixed axis normal to said arm and parallel to the path of movement thereof, said transducer means being balanced so as to exert a very low pressure on a record to be played, means biasing said transducer means to urge a portion thereof away from said arm and insure proper tracking on the record, and manually depressable actuator means coupled to said transducer means for exerting on the latter a force counter to said biasing means to urge said transducer means portion towards said arm.

4. In a phonograph pickup device, the combination of an arm mounted for pivoting movement at one end thereof about a vertical axis only and having a housing portion adjacent the other end thereof, a support member pivotally mounted intermediate its ends about a fixed axis normal to said arm and parallel to the path of movement thereof, record groove responsive electroacoustic transducer means carried by said support member on one side of the pivotal mounting thereof, means balancing said transducer means to exert low pressure on a record to be played, spring means biasing said support member to urge said transducer means normally away from said arm into proper tracking relation with said record, and actuator means coupled to said support member at a position on the other side of the pivotal mounting therefor and having a manually depressable portion extending upwardly through an opening in said housing whereby said transducer means may be moved towards said arm to facilitate removing said transducer means from the surface of a record.

References Cited in the file of this patent

UNITED STATES PATENTS

| | | |
|---|---|---|
| 2,287,809 | Leonard | June 30, 1942 |
| 2,293,217 | Rieber | Aug. 18, 1942 |
| 2,357,033 | Thompson | Aug. 29, 1944 |
| 2,554,919 | Mullaney | May 29, 1951 |
| 2,562,245 | Thompson | July 31, 1951 |
| 2,568,671 | Vistain | Sept. 18, 1951 |
| 2,665,919 | Baker | Jan. 12, 1954 |